Nov. 11, 1969 R. C. BUE ET AL 3,477,760

MULTIPURPOSE TEACHING UNIT

Filed June 2, 1966 5 Sheets-Sheet 1

INVENTORS
RICHARD C. BUE
JULIAN GUTIERREZ
BY Merchant & Gould
ATTORNEYS

MULTIPURPOSE TEACHING UNIT

Filed June 2, 1966 5 Sheets-Sheet 2

INVENTORS
RICHARD C. BUE
JULIAN GUTIERREZ
BY Merchant & Gould
ATTORNEYS

MULTIPURPOSE TEACHING UNIT

Filed June 2, 1966 5 Sheets-Sheet 3

INVENTORS
RICHARD C. BUE
JULIAN GUTIERREZ
BY Merchant & Gould
ATTORNEYS

INVENTORS
RICHARD C. BUE
JULIAN GUTIERREZ
BY Merchant & Gould
ATTORNEYS

MULTIPURPOSE TEACHING UNIT

Filed June 2, 1966 5 Sheets-Sheet 5

INVENTORS
RICHARD C. BUE
JULIAN GUTIERREZ
BY Merchant & Gould
ATTORNEYS

United States Patent Office 3,477,760

Patented Nov. 11, 1969

3,477,760

MULTIPURPOSE TEACHING UNIT

Richard C. Bue and Julian Gutierrez, Minneapolis, Minn., assignors to Sico Incorporated, Minneapolis, Minn., a corporation of Minnesota Filed June 2, 1966, Ser. No. 554,878

Int. Cl. A47b 83/02

U.S. Cl. 297—157 15 Claims

ABSTRACT OF THE DISCLOSURE

An integral teaching unit having a generally U-shaped table with an indentation formed in the flat end thereof for occupancy by a teacher, a plurality of chairs positioned around the periphery of the table to provide individual seating for a group of students and to provide support for the table, and a visual aid holder supported by a bifurcated floor engaging base portion and being pivotally attached to the table adjacent the indentation by a generally horizontally extending control bar. The periphery of the table is provided with individual storage spaces for the students. The chairs are arranged in pairs, each chair having a vertical leg member, with a horizontal cross bar connecting each pair. Each pair is connected to the table by a support member having a first horizontally extending portion secured to the bottom of the table, a vertical portion, and a second horizontally extending portion secured to the cross bar at its mid point.

It is common practice in instructional situations, especially with regard to the primary grades, to teach activities such as reading and art in small closely controlled groups. The small group of students is often placed by the teacher in a semicircular array in front of a blackboard or easel. The students are thus located quite close to the teaching aid and are also in close proximity to the teacher. This small group of students is normally being instructed in one particular activity while the remainder of the class occupies itself with other activities or study.

This so-called "controlled group instruction" is basically an awkward situation to handle unless the teacher is provided with suitable equipment. Ordinarily, a group of individual chairs are placed where the students are to sit. Since the chairs are individually movable, there is often noise from students moving the chairs, and the students often crowd each other. Further, in such a situation, the students have no surface on which to work. The students therefore must hold all materials such as books and pencils on their lap. When the materials are not in use, they have to be placed on the floor where they are often in the way.

The instructor also has a difficult time in finding a good position from which to work. Not only do the students block each other's view of the teacher and of the blackboard, but the teacher often finds it difficult to use the visual teaching aids without blocking the view of the students. Thus, the teacher must often assume awkward teaching positions in order to both view the class and present the material on the teaching aid.

We are aware that others have developed a multipurpose teaching unit of the general type described herein. The teaching unit of the prior art disclosed a table having a section thereof cut away to provide a teaching station within the boundaries of the table. Located around the periphery of that table were a plurality of student stations. Each student was provided with a stool or chair and with a storage space in the table. A display panel was mounted on the table so as to be visible by the students around the table.

SUMMARY OF THE INVENTION

The present invention provides a multipurpose teaching unit designed to provide individual seating for a group of students and to provide for individual attention and control by a centrally positioned teacher. A generally U-shaped table top is provided having an indentation formed in the flat end thereof for occupancy by the teacher. The table top is supported by means including a plurality of support members arranged around the periphery of the table, each having a first horizontally extending portion attached to the bottom of the table top, a downwardly extending portion attached thereto, and a second horizontal portion attached thereto and extending outwardly from the table top. A horizontal cross bar is attached at its mid point to the end of each second portion, and a floor engaging vertical leg member is attached to each end of the cross bar. An adjustable seat member is mounted on each leg member. A visual aid holder is pivotally connected to the table top adjacent the indentation by a generally horizontally extending control bar and is also supported from the floor by a bifurcated floor engaging base portion.

A teaching unit of the type described herein is a vast improvement over the first described method of conducting group teaching activity. When positioned in the teaching station, the teacher is close to each of the students so that better control of the class is possible. Since the teacher is centrally located, it is possible to view all of the students at all times. The teacher does not have to move to the side of individual students to help them. Each student is within reach of the teacher. Further, the entire group is within quiet conversational distance of the teacher so that disturbance of other students in the room is minimized. Further, the teacher remains seated while distributing materials to the students to further reduce disturbance.

There are many other advantages to be gained from the use of such a unit. Each student has a permanently located individual seat and an individual storage slot built into the table directly in front of him. Books, pencils, and other items can be stored out of the way when not in use. The student can thus concentrate on the particular material he is using. The table also, of course, provides a top on which the student can work. Plenty of space is available for each student and also for the teacher. Since the seating units are an integral part of the assembly, there is no noise from moving chairs and the students do not crowd each other. Because the students are seated in fixed positions around the table, each of them has an unobstructed view of the visual aid display device. The teacher is also situated in the teaching station so as to not obstruct the students' view of the display device.

Another advantage of such a unit is the fact that the seating stations are attached directly to the table so that the table cannot be displaced with respect to the seating units. Because of these many advantages, this type of unit creates ideal conditions for controlled primary grade instruction. The unit is ideal for reading instruction, art, and group activity, science demonstration, small group meetings, special education, and crowded class room problems.

It is therefore a primary object of our invention to provide an improved multipurpose teaching unit including a teaching table having a teaching station therein, a plurality of permanently fixed seating stations surrounding the teaching table, and a visual aid holder or display device attached to the table.

Another object of our invention is to provide a generally U-shaped teaching table having a teaching station or indentation formed in the flat end thereof, the indentation having a rounded inner portion and side walls that flare outwardly toward the edge of the table so that the entrance to the teaching station is wider than the inner portion thereof.

Another object of our invention is to provide a teaching table having a top section and a bottom section rigidly connected by means forming individual storage compartments around the periphery of the table, and in which the indentation in the bottom section is deeper than the indentation in the top section so that leg room for the teacher is provided.

A further object of our invention is to provide a plurality of evenly spaced support members around the periphery of the teaching table to support both the table and the individual chairs, each support member providing support for a pair of chairs and associated back rests, and providing means to both vertically and horizontally adjust the position of the chairs with respect to the table.

Another object of our invention is to provide a visual aid holder pivotally attached to the teaching table so that it can be rotated about the pivotal connection with the table.

Another object of our invention is to provide a visual aid holder having an easel thereon that can be raised or lowered, pivotally swung about the connection with the table, moved closer to or away from the table, and that is rotatable about both its vertical and its horizontal axes.

These and other objects of the present invention will become apparent from the specification and claims when considered in connection with the accompanying drawings in which:

Figures 1, 4, 5:
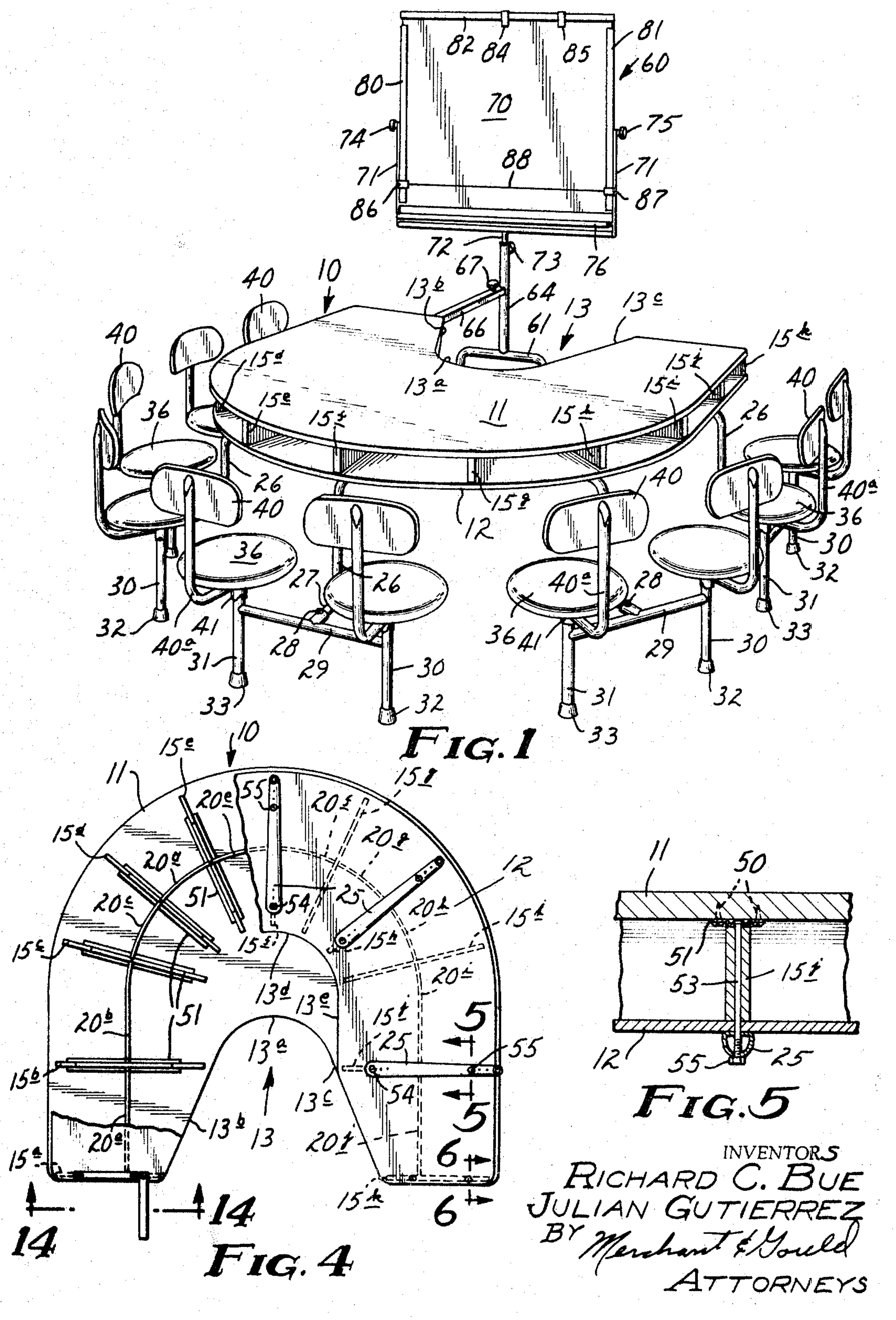
FIG. 1 is a perspective view of the teaching unit of our invention.
FIG. 4 is a bottom view taken along the line 4—4 of FIG. 2, with parts thereof broken away.
FIG. 5 is an enlarged sectional view taken along line 5—5 of FIG. 4, rotated 180 degrees.
Figures 2, 3, 7:
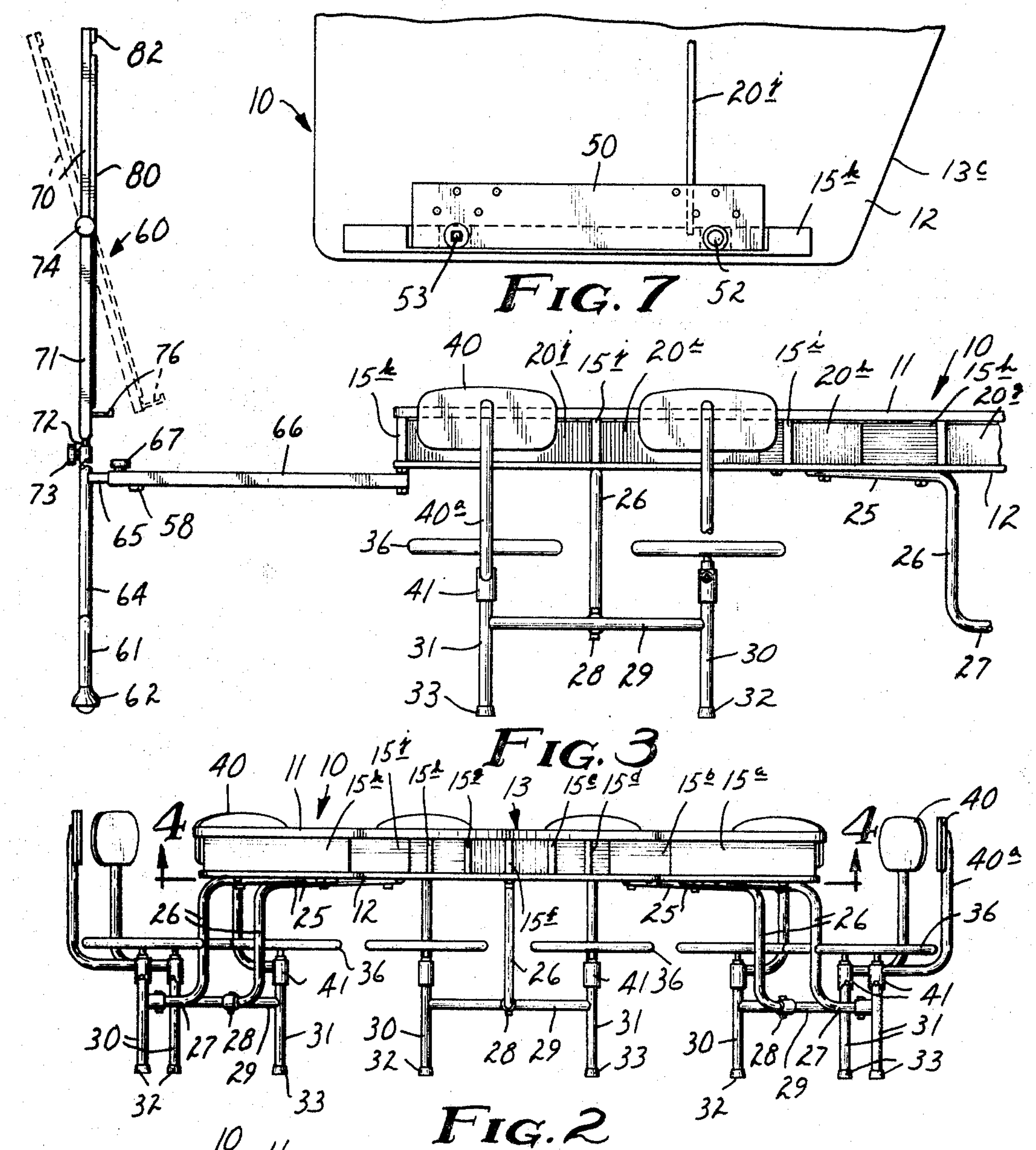
FIG. 2 is a rear view of the teaching unit of FIG. 1 with the visual aid holder removed.
FIG. 3 is a somewhat enlarged side elevation view as seen from the left hand side of the teaching unit of FIG. 1, parts thereof broken away and removed.
FIG. 7 is a sectional view taken along line 7—7 of FIG. 6.

The multipurpose teaching unit of our invention, as disclosed in FIG. 1, includes a teaching table 10 having a top section 11 and a bottom section 12. Teaching table 10 has a generally U-shaped configuration with a generally semicircular first end, a flat second end, and a pair of opposite generally parallel sides connecting the first and second ends. The second end of teaching table 10 has an indentation or teaching station 13 formed therein for occupancy by a teacher during controlled group instruction.

As more clearly shown in FIG. 4, referring to top section 11, indentation 13 has a rounded, arcuate, or generally semicircular inner portion **13*a* and a pair of sides 13*b* and 13*c* that diverge or flare outwardly therefrom toward the second or flat end of the teaching table 10. Teaching station 13** is thus wider at its open end than at its closed ends to facilitate the teacher's movements therein.

In the preferred embodiment shown in the drawings, indentation 13 in top section 11 extends into the table less than half the distance from the second end to the first end. Indentation 13 in bottom section 12, however, extends more than half the distance from the second end to the first end to provide leg room for a teacher seated in the indentation or teaching station. Indentation 13 in bottom section 12 includes an outer portion having a conformation or configuration similar to that of the indentation in the top section 11, and further includes an extended inner portion with a rounded or semicircular end **13*d* and a pair of opposite edges 13*e* that are formed parallel to each other and parallel to the sides of teaching table 10**.

Teaching table 10 is sized such that a teacher positioned in teaching station 13 has access to the entire top surface of the table so that any of the students surrounding the table can obtain help from the teacher. The leg room provided by the extended indentation in bottom section 12 enables the table to be mounted low enough to accommodate small children from the primary grades.

Top section 11 is separated from bottom section 12 by a plurality of divider members **15*a*–15*k* that extend from the outer edge of table 10 in wardly toward indentation 13. Extending laterally between adjacent pairs of divider members 15*a*–15*k* are a plurality of stop members 20*a*–20*j*. Each adjacent pair of divider members such as 15*a* and 15*b*, together with the associated stop member such as 20*a* form individual storage compartments for the students seated around the table. In the preferred embodiment of our invention, a total of ten storage compartments are formed that extend inwardly from the outer periphery of the table to approximately half the distance to indentation 13. Stop members 20*a*–20*j* could of course be located closer to or farther away from the periphery of table 10** if different depth compartments were desired.

Mounted around the sides and rounded end of table 10 are a plurality of student stations, in this case ten. The student stations are combined with the apparatus for supporting table 10.

Figures 8, 9, 10:
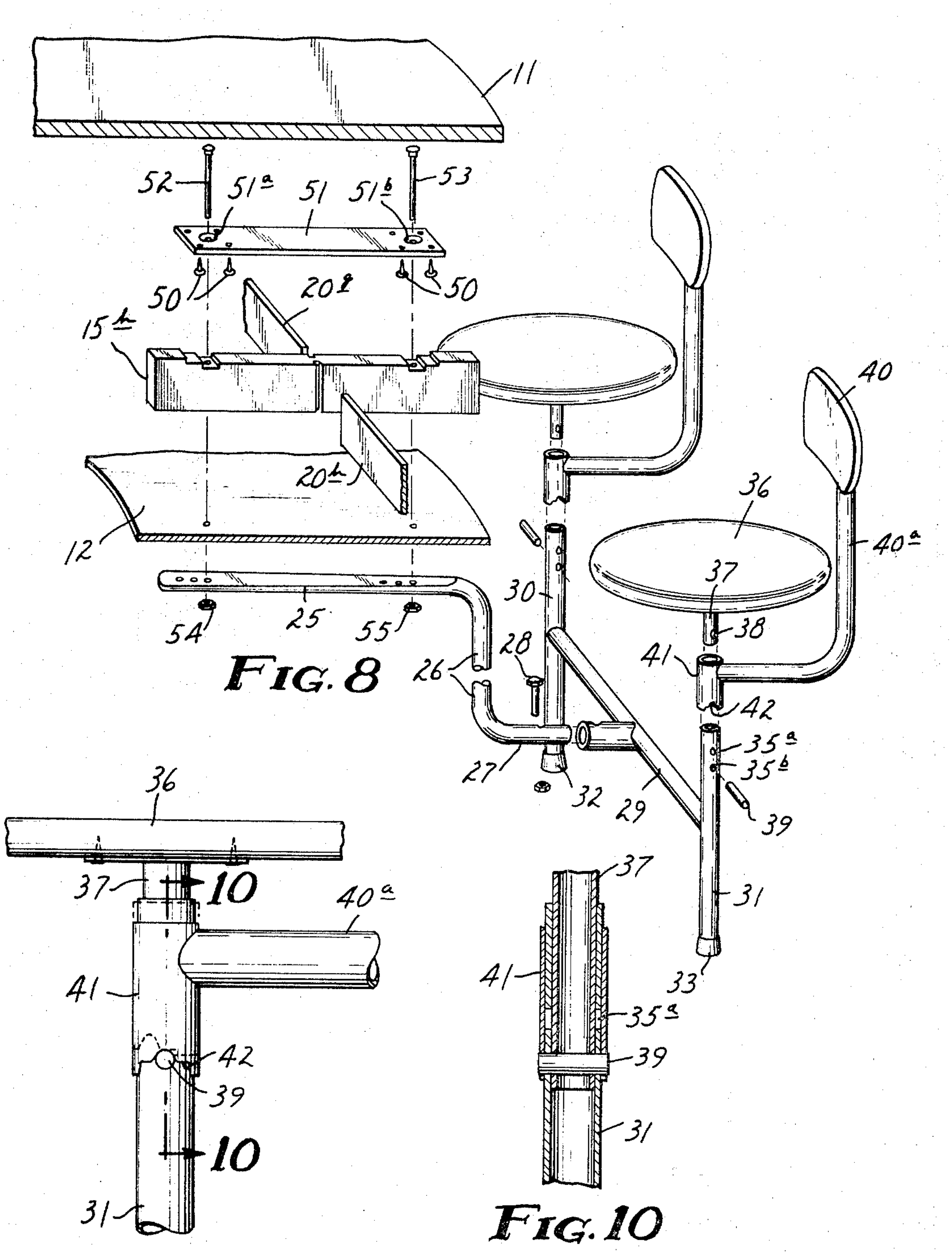
FIG. 8 is an enlarged exploded perspective view of the supporting apparatus for the table and seats, parts thereof broken away and shown in section.
FIG. 9 is an enlarged view showing the adjustable support means for the back rest, parts thereof broken away.
FIG. 10 is a sectional view as seen from line 10—10 of FIG. 9.

As best shown in FIG. 8, showing divider member **15*h*, each support member for table 10 has a first horizontally extending portion 25 attached to bottom section 12 in line with one of the divider members 15*b*, *d*, *f*, *h*, or *j*. First portion 25 has a flat upper surface that lies in contact with bottom section 12 to prevent rotation of the support members with respect to the table. A vertical portion 26 of the support members extends downwardly adjacent the edge or periphery of table 10, and a second horizontal portion 27 extends outwardly from table 10. Attached to the end of second portion 27 by a bolt 28 is a telescoping T-bar or cross bar 29. Cross bar 29 is attached to second portion 27** at its mid-point and extends horizontally therefrom.

Attached to the opposite ends of cross bar 29 are a pair of leg members 30 and 31. Each of the leg members 30 and 31 has a rubber floor engaging pad 32 and 33 mounted on the bottom end thereof.

Each of the leg members 30 and 31 has a chair and back rest assembly mounted on the top end. Since the assembly is the same for all student stations, a description of one such assembly will be sufficient. Referring particularly to FIGS. 8, 9, and 10, leg member 31 is hollow and has a pair of holes 35*a* and 35*b* drilled through the top end thereof. Mounted at the top of leg member 31 is a circular seat 36 having a shaft 37 rigidly connected to the bottom thereof at its center. Shaft 37 extends outwardly perpendicular to the plane of seat 36. A hole 38 is drilled or otherwise formed in the end of shaft 37. Shaft 37 has a diameter slightly smaller than the inside diameter of leg member 31 so that it can be telescoped therein as shown in FIGS. 9 and 10. When seat 36 is assembled to leg member 31, a pin 39 extends through one of the openings 35*a* or 35*b* and through opening 38 to fix the position of seat 36 with respect to leg member 31. Since two adjustment holes are provided in leg member 31, the height of seat 36 can be adjusted.

Also mounted on leg member 31 is a back rest 40 having a tubular support member 40*a* bent at right angle to support back rest at one end and having the other end connected to tubular portion 41 that fits over leg member 31. The inside diameter of tubular member 41 is slightly larger than the outside diameter of leg 31 so that back rest 40 can be moved vertically or can be rotated with respect to leg member 31. Pin 39 is designed to extend a short distance beyond the outside surface of leg member 31 so that the ends provide a support for tubular member 41. A characterized groove 42 formed in each side of the bottom of tubular member 41 is designed such that the bottom of groove 42 will normally be in contact with pin 39. As shown in FIG. 9, however, back rest 40 can be swung through an arc of approximately 30 degrees in each direction by raising it a slight amount. The vertically extending portions adjacent the bottom end of groove 42 act to limit the travel of back rest 40.

Figure 6:
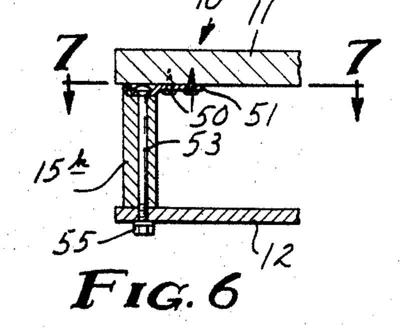
FIG. 6 is an enlarged sectional view taken along line 6—6 of FIG. 4, rotated 180 degrees.

Referring again to FIG. 8, there is disclosed in detail the means for rigidly mounting the top section 11 to bottom setcion 12 and to first horizontal portion 25 of the support members. Rigidly mounted to the bottom of top section 11 by fastening means such as screws 50 is a flat metal mounting bracket 51. A mounting bracket such as 51 is mounted between the top section 11 and each of divider members 15*a-k*. Each of the mounting brackets 51 has a pair of recessed holes 51*a* and 51*b* formed therein designed to accept the rounded head of a machine bolt such as 52 and 53. Bracket 51 thus fits flush against the bottom surface of top section 11 and supoprts bolts 52 and 53 by means of holes 51*a* and 51*b*. FIG. 8 discloses the configuration of the mounting brackets 51 that are associated with divider members 15*b* through 15*j*. The configuration of the bracket members associated with divider members 15*a* and 15*k* is slightly different, although performing the same function as shown in FIG. 6.

The top edge of each of the divider members 15*a* through 15*k* is cut away to accommodate the associated bracket member 51. This construction is shown in FIG. 8. Bolts 52 and 53 thus extend downwardly through the holes in bracket member 51 through holes drilled vertically in the associated divider member and through holes drilled in bottom section 12.

As shown in FIG. 4, the table support members are attached in line with alternate divider members. Therefore, in the case where a support member is involved, bolts 52 and 53 extend through holes drilled in the flat surface of first horizontal portion 25 of the support members. A pair of nuts 54 and 55 are then threaded on the ends of bolts 52 and 53 respectively to draw all of the members tightly together. In the situation where no table support member is involved, a washer would be placed on each bolt between the nut and the bottom surface of bottom section 12.

As shown in FIG. 8, each of the first horizontal portions 25 of the support members have a plurality of holes formed therein so that the support member can be adjusted inwardly or outwardly with respect to the table. For larger children, the student seating stations can thus be moved farther away from the edge of the table while for smaller children, they can be moved closer to the table.

It should again be mentioned that the above described support members support not only the table but also the seating stations surrounding the table. The particular construction of the support members whereby a single member extending from the table acts to help support two seats is an especially important improvement. For one thing, the area in front of each seat is free from supporting structure so that space is available for the legs of the children. Neither is the supporting structure in the way when a child enters or leaves the seat. Further, the dual leg arrangement eliminates any torque on first portion 25 since there is no tendency to rotate first portion 25. This advantage is obtained even though one of the seats might be empty.

It might also be noted at this point that the top and bottom sections of table 10 are each constructed as a single unitary structure whereby the rigidity of the table is greatly increased. The combination table and seating structure of our invention has proved to be extremely rigid and unlikely to require frequent repair.

An important part of our invention is the visual aid holder 60 that is connected to the second end of table 10 adjacent indentation 13. Holder 60 has a bifurcated base portion 61 with floor engaging rollers 62 and 63 attached thereto. Extending upwardly from base portion 61 is a hollow mounting shaft 64. Connected to an intermediate portion of mounting shaft 64 is a horizontal control bar having a first section 65 slidably mounted in a second section 66. The horizontal control bar can be locked at any given length by a lock screw 67 extending through second section 66. A lock screw 58 on second section 66 coacts with a stop member 59 on first section 65 to prevent the two sections from separating. The free end of second section 66 is pivotally connected to table 10 by means of a bracket 68 fastened to the bottom of table 10 by bolts 52 and 53 and a bolt 69 extending through aligned holes formed in bracket 68 and horizontal control bar 66 respectively. Visual aid holder 60 is thus pivotable about pin 69 at a distance determined by the adjusted length of the horizontal control bar.

Visual aid holder 60 further includes a combination blackboard and projector screen 70 supported by a U-shaped frame 71 having a rod 72 extending downwardly into mounting shaft 64. Rod 72 can be raised or lowered within shaft 64 and can be rotated therein. It is locked in place in shaft 64 by means of a set screw 73. Because of this attachment, blackboard 70 can be raised or lowered or can be rotated about its vertical axis.

Frame 71 is connected to blackboard 70 by means of a pair of set screws 74 and 75 that extend through frame 71 into blackboard 70. Set screws 74 and 75 are located on or near the horizontal axis of blackboard 70 so that blackboard 70 can be rotated about them and then locked in any desired position. It is noted that one side of blackboard 70 is a chalk board while the opposite side is a projector screen. Mounted at the bottom of the blackboard 70 is a chalk tray 76.

Mounted at the two sides and at the top of blackboard 70 are channel members 80, 81, and 82. Mounted within the oepn groove of each channel member 80, 81, and 82 is a tack board in the form of a cork strip 80*a*, 81*a*, and 82*a*. The tack board can be used to tack or otherwise attach various papers or materials to visual aid holder 70.

Slidably mounted on channel member 82 are a pair of sliding hooks 84 and 85. Hooks 84 and 85 are individually adjustable and can be used to support various articles or materials in front of visual aid holder 60.

Mounted on channel members 80 and 81 are a pair of sliders 86 and 87 respectively. Connected between sliders 86 and 87 is a taut spring 88. Sliders 86 and 87 have a reasonably tight fit with their associated channel members so that they will remain in any position in which they are set. Visual aid materials such as charts or placards can thus be placed behind spring 88 for viewing by the students. When not in use, sliders 86 and 87, and spring 88, can be moved to the top or bottom of the board out of the way. Although a spring 88 is used in the preferred embodiment, it should be evident that any elastic material could be utilized for the same purpose.

Figures 11, 12, 13, 14:
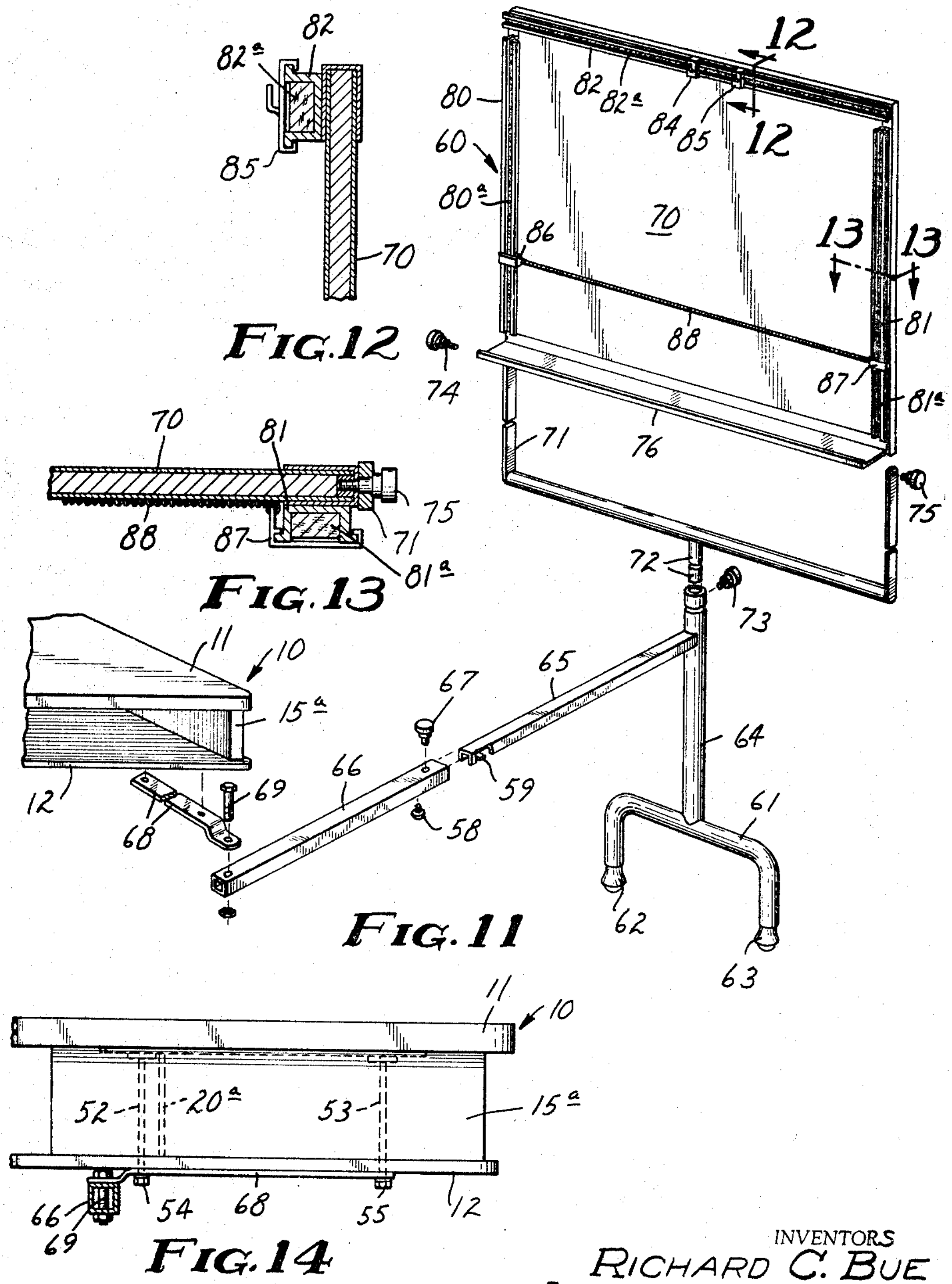
FIG. 11 is an enlarged exploded perspective view of the visual aid holder disclosed in FIG. 1, parts thereof broken away.
FIG. 12 is an enlarged sectional view taken along line 12—12 of FIG. 11.
FIG. 13 is an enlarged sectional view taken along line 13—13 of FIG. 11.
FIG. 14 is an enlarged setcional view taken along line 14—14 of FIG. 4, rotated 180 degrees.
Figures 15, 16:
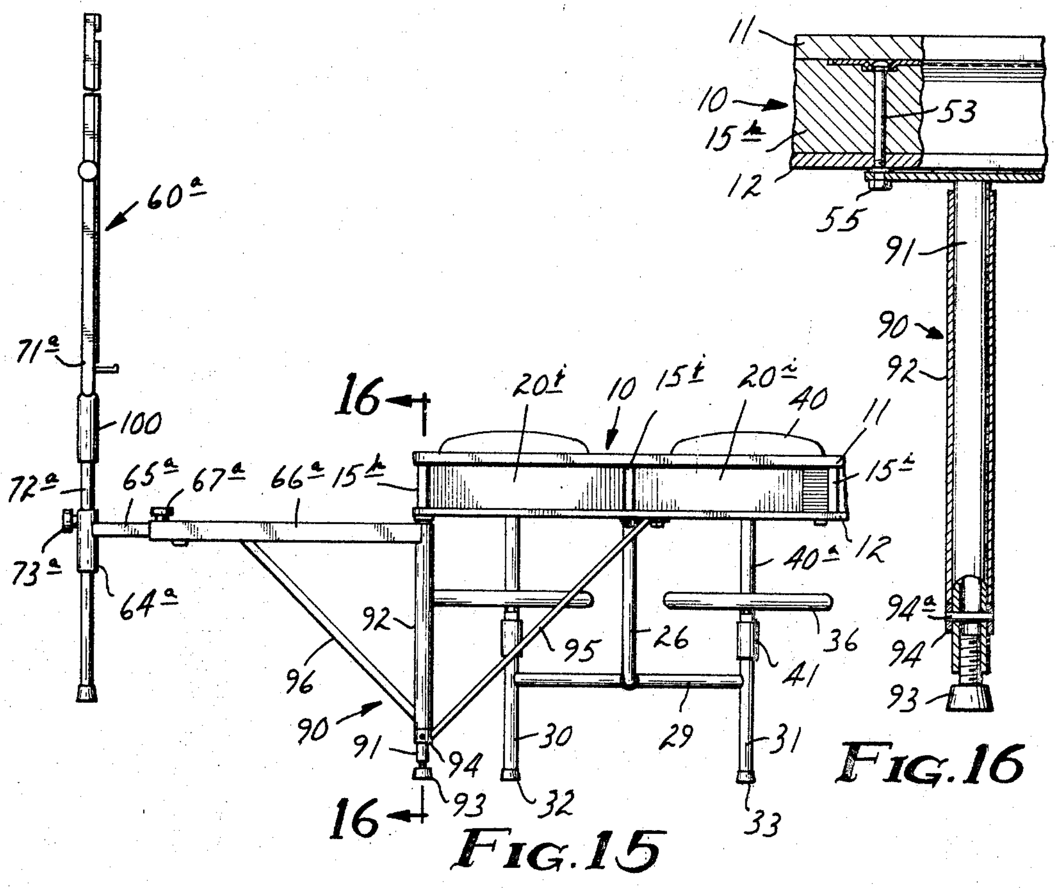
FIG. 15 is a side elevational view similar to FIG. 3 showing a modified visual aid holder and modified means for attaching the visual aid holder to the table, with some parts broken away and shown in section.
FIG. 16 is an enlarged sectional view taken along line 16—16 of FIG. 15, some parts shown in elevation.

Referring now to FIG. 15, there is disclosed a modified visual aid holder 60*a* including a modified means for connecting it to table 10. The display portion of the visual aid holder is the same as that shown in FIG. 11 so it need not be described further here. Instead of being supported from the floor by a bifurcated base portion 61, however, visual aid holder 60*a* is fully supported from table 10.

Attached to the edge of table 10 in place of bracket 68 is an adjustable support leg designated 90. Support leg 90 having pivot shaft 91 is attached to bottom section 12 and extends downwardly therefrom. Mounted for rotation on pivot shaft 91 is a hollow shaft 92 that extends downwardly to a point near the floor. Extending upwardly into shaft 91 is a floor engaging member 93 that can be adjusted by means of threaded engagement with the lower end of shaft 91. Attached to the lower end of pivot shaft 91 by pin 94*a* is stop collar 94 which prevents shaft 92 from excessive downward movement. Thus pin 94*a* extends through the stop collar 94 and pivot shaft 91. Shaft 92 is thus supported for rotation on collar 94.

Support leg 90 is further supported by means of a brace 95 that extends from collar 94 to bottom section 12. More than a single brace can be utilized if desired.

Welded or otherwise connected to the top of shaft 92 is second section 66*a* of the horizontal control bar. A second brace 96 extends from the bottom of shaft 92 to a position near the center of bar 66*a*.

A first section 65*a* of the horizontal control bar is again slidable within second section 66*a* and can be locked at any given position by lock screw 67*a*. Attached to the end of first section 65*a* is a short vertically extending mounting shaft 64*a* having a set screw 73*a* therein. Extending vertically through mounting shaft 64*a* is a mounting rod 72*a*. Rod 72*a* does not touch the floor, but can be vertically raised and lowered within shaft 64*a*.

Extending downwardly from the center of frame 71*a* is a tubular cap member 100. Cap member 100 is welded or otherwise firmly attached to frame 71*a*. Rod 72*a* extends upwardly into cap 100 so that the entire upper portion of visual aid holder 60*a* is rotatable about rod 72*a* by means of cap 100.

The modified visual aid holder 60*a* of FIG. 15 can thus be rotated about its vertical axis by means of cap 100 and rod 72*a*. It can be raised or lowered through mounting shaft 64*a* and locked in position by set screw 73*a*. It can be moved toward or away from table 10 by means of first section 65*a* extending into second section 66*a* of the horizontal control bar. It can also be pivoted about pin 91 by means of rotatable shaft 92. This modified version of the visual aid holder can be used in a situation where the use of floor engaging rollers is undesirable. Since an additional support leg 90 is provided with this modification, there is little tendency to tip table 10. It should be noted at this time that support leg 90 can be removed from table 10 and mounted to any other support such as a shelf or wall. Support leg 90 could be mounted to a wall by providing shaft 91 with a separate collar 94 on both ends with brackets welded to collar 94 for securing to the wall.

Figure 17:
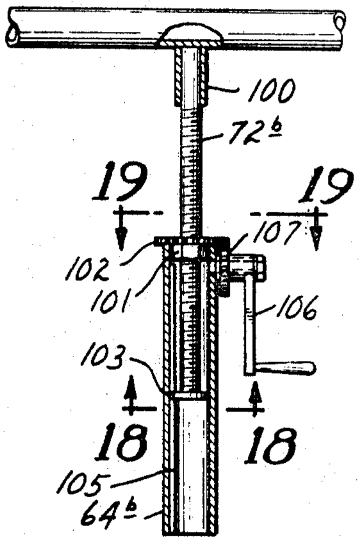
FIG. 17 is an enlarged transverse sectional view showing a modified means for adjusting the height of the visual aid holder.
Figures 18, 19:
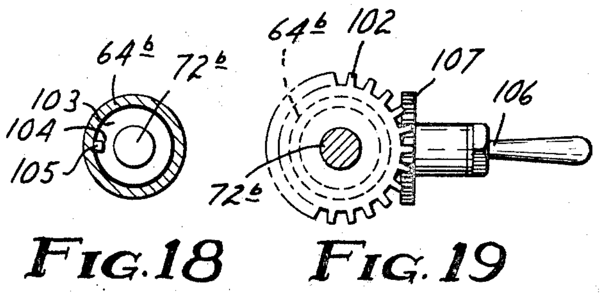
FIG. 18 is an enlarged sectional view taken along line 18—18 of FIG. 17.
FIG. 19 is an enlarged sectional view taken along line 19—19 of FIG. 17.

Referring now to FIGS. 17, 18, and 19, there is disclosed a means of controlling the height of visual aid holder 60 or 60*a*. In this modified version, support rod 72*b* is threaded throughout virtually its entire length. The upper end of rod 72*b* again extends into cap 100 so that visual aid holder 60 or 60*a* is rotatable about its vertical axis. Threaded rod 72*b* is threadedly engaged with a nut 101 that is welded to a horizontally disposed gear 102. Gear 102 is of larger diameter than shaft 64*b* so that it supports the entire easel on top of shaft 64*b*. Mounted on the bottom end of rod 72*b* is a guide member 103 having a key-way 104 formed in the edge thereof. Formed vertically within shaft 64*b* is a guide key 105. As shown in FIG. 17, rod 72*b* with nut 101 and gear 102 mounted thereon extends downwardly into shaft 64*b* with key-way 104 sliding over key 105. It can be seen that guide member 103 will permit vertical movement of rod 72*b* within shaft 64*b*, but will prevent rotation thereof.

Attached to the outside upper portion of shaft 64*b* is a hand operated crank member 106 having a vertically disposed gear 107 connected thereto. Gear 107 meshes with gear 102 on shaft 72*b*.

When it is desired to raise or lower the visual aid holder, crank member 106 is turned in the appropriate direction. Gear 107 meshes with gear 102 to cause rotation of nut 101. Rod 72*b*, which is threadedly engaged with nut 101, is thus raised or lowered since it cannot rotate with nut 101. Because of the relatively flat slope of the threads on rod 72*b*, there is sufficient friction to prevent the visual aid holder from falling of its own weight. Therefore, no locking means are required.

While we have shown and described a preferred embodiment of our invention, it is evident that changes might be made without departing from the invention. It will therefore be understood that the invention is capable of further modification without departure from the spirit and scope of the invention.

We claim:

1. An integral teaching unit designed to provide individual seating and storage space for a group of students and to provide for individual attention and control by a centrally positioned teacher having command of a multipurpose visual aid holder situated for unobstructed viewing by both students and teacher, comprising:

(a) a table having a top section and a bottom section, said table being generally U-shaped with a generally semicirculr first end, a pair of opposite generally parallel sides, and a second flat end having an indentation formed therein for occupancy by a teacher during controlled group instruction, said indentation in said top section extending less than half the distance from said second end to said first end and having a rounded inner portion and sides diverging outwardly therefrom toward said second end, said indentation in said bottom section extending more than half the distance from said second end to said first end to provide leg room for a teacher seated in said indentation;

(b) means for rigidly mounting said top section to said bottom section to provide storage space between them, including a plurality of spaced divider members extending from the outer edge of said table inwardly toward said indentation, and a plurality of stop members extending laterally between adjacent pairs of divider members intermediate the ends thereof, whereby individual storage compartments are formed for each student;

(c) means for supporting said table including a plurality of support members each having a first horizontally extending portion attached to said bottom section in parallel with one of said divider members, a vertical portion attached thereto and extending downwardly adjacent the edge of said table, a second horizontal portion attached thereto and extending outwardly from said table, a horizontal cross bar attached at its midpoint to the end of said second horizontal portion, and a floor engaging vertical leg member attached to each end of said cross bar;

(d) a seat member and an adjustable back rest member mounted on the top of each leg member; and (e) a visual aid holder connected to said second end of said table adjacent said indentation, said holder having a bifurcated base portion with floor engaging rollers attached thereto, a mounting shaft extending vertically upwardly from said base portion, an adjustable easel mounted on said mounting shaft, and a horizontal control bar rigidly connected at one end thereof to said vertical mounting shaft and pivotally connected at the other end thereof to said table so that said visual aid holder can be rotated about said pivotal connection with said table.

2. An integral teaching unit designed to provide individual seating and storage space for a group of students and to provide for individual attention and control by a centrally positioned teacher having command of a multipurpose visual aid holder situated for unobstructed viewing by both students and teacher, comprising:

(a) a table having a top section and a bottom section, said table being generally U-shaped with a rounded first end, a pair of sides, and a second end having an indentation formed therein for occupancy by a teacher during controlled group instruction, said indentation in said top section extending a predetermined distance from said second end toward said first end, said indentation in said bottom section extending farther toward said first end than said indentation in said top section to provide leg room for a teacher seated in said indentation;

(b) means for rigidly mounting said top section to said bottom section to provide storage space between them, including a plurality of spaced divider members extending outwardly from said indentation, and a plurality of stop members extending laterally between adjacent pairs of divider members, whereby individual storage compartments are formed for each student;

(c) means for supporting said table including a plurality of support members each having a first horizontally extending portion attached to said bottom section, a vertical portion attached thereto and extending downwardly adjacent the edge of said table, a second horizontal portion attached thereto and extending outwardly from said table, a horizontal cross bar attached to the end of said second portion, and a floor engaging vertical leg member attached to each end of said cross bar;

(d) a seat member and back rest member mounted on each leg member; and (e) a visual aid holder connected to said second end of said table adjacent said indentation, said visual aid holder having a mounting shaft with an easel mounted thereon, and a control bar connected at one end thereof to said mounting shaft and pivotally connected at the other end thereof to said table so that said visual aid holder can be rotated about said pivotal connection with said table.

3. The apparatus of claim 2 wherein said top and bottom sections of said table are each constructed as a single, unitary structure to thereby increase the rigidity of said table when said top and bottom sections are connected together and wherein said indentation in said top section extends less than half the distance from said second end toward said first end and said indentation in said bottom section extends more than half the distance from said second end to said first end to provide leg room for a teacher seated in said indentation.

4. The apparatus of claim 2 wherein said table is generally U-shaped with a semicircular first end, wherein said pair of sides are generally parallel to each other, wherein said indentation in said top section has a rounded inner portion and sides diverging outwardly therefrom toward said second end, and wherein said indentation in said bottom section includes an outer portion having a conformation similar to that of the indentation in said top section, and a deeper inner portion with a semicircular end and a pair of opposite edges that are formed parallel to each other and parallel to said sides of said table.

5. The apparatus of claim 2 wherein said means for rigidly mounting said top section to said bottom section further includes a rigid flat metal mounting bracket rigidly attached to the bottom of said top section between said top section and each of said divider members, and fastening means extending vertically through said mounting bracket, said divider member, and said bottom section to hold the sections together.

6. The apparatus of claim 5 wherein said fastening means include a plurality of bolts having nuts threadedly attached to the ends thereof and wherein said bolts further extend through said first horizontally extending portion of said support members to rigidly hold said support members to said bottom section.

7. The apparatus of claim 2 wherein said first horizontally extending portion of each of said support members has a flat upper surface that lies in contact with said bottom section to prevent rotation of said support members with respect to said table.

8. The apparatus of claim 2 wherein means are provided to adjust the distance said support members extend outwardly from the edge of said table and wherein means are provided to adjust the height of said seat members.

9. The apparatus of claim 2 wherein the height of said back rest members is adjustable and wherein means are provided to permit the rotation of said back rest members through a predetermined arc of travel.

10. The apparatus of claim 2 wherein means including said mounting shaft are provided to adjust the height of said easel and wherein means including said control bar are provided to adjust the distance of said easel from said table.

11. The apparatus of claim 2 wherein said easel comprises a combination blackboard and projector screen, wherein means including a supporting frame are provided to support said easel so that it is rotatable about a horizontal axis and wherein means are provided to permit rotation of said easel about its vertical axis.

12. The apparatus of claim 2 wherein said visual aid holder includes a bifurcated base portion supporting said mounting shaft, said base portion having floor engaging rollers attached thereto.

13. The apparatus of claim 2 wherein said visual aid holder is pivotally connected to said table by means including a floor engaging support leg for said table and a tubular shaft mounted for rotation on said support leg, said control bar being connected to said tubular shaft.

14. The apparatus of claim 2 including means for raising or lowering said easel, comprising:

(a) a threaded rod extending downwardly from said easel into said mounting shaft; and (b) means mounted on said mounting shaft and threadedly engaged with said rod to raise or lower said rod while preventing rotation thereof.

15. An integral teaching table designed to provide individual seating for a group of students and to provide for individual attention and control by a centrally positioned teacher, comprising:

(a) a table top having an indentation formed therein for occupancy by a teacher during controlled group instruction, said table top having a top section and a bottom section, said table top being generally U-shaped with a generally semicircular first end, a pair of opposite generally parallel sides, and a second flat end having said indentation formed therein, said indentation in said top section extending less than half the distance from said second end to said first end and having a rounded inner portion and sides diverging outwardly therefrom toward said second end, said indentation in said bottom section, extending more than half the distance from said second end to said first end to provide leg room for a teacher seated in said indentation;

(b) means for supporting said table top including a plurality of support members arranged around the periphery thereof each having a first horizontally extending portion attached to the bottom of said table top, a downwardly extending portion attached thereto, a second horizontal portion attached thereto and extending outwardly from said table top, a horizontal cross bar attached at its midpoint to the end of said second portion, and a floor engaging vertical leg member attached to each end of said cross bar; and (c) a seat member mounted on each leg member.

References Cited

UNITED STATES PATENTS

| | | | |
|---|---|---|---|
| 600,234 | 3/1898 | Parr | 35—60 |
| 1,349,710 | 8/1920 | Beeson | 211—10 |
| 1,375,855 | 4/1921 | O'Connor | 108—60 |
| 1,756,210 | 4/1930 | Racz | 297—345 X |
| 1,818,606 | 8/1931 | Burks | 312—239 |
| 2,560,001 | 7/1951 | Scholfield et al. | 312—239 X |
| 2,660,504 | 11/1953 | Bridge | 312—239 |
| 3,017,969 | 1/1962 | Nielson | 35—63 X |
| 3,266,840 | 8/1966 | D'Estrube | 297—170 |
| 3,285,555 | 11/1966 | Bevington | 297—345 |
| 3,366,415 | 1/1966 | Cooper | 297—135 X |

JAMES T. McCALL, Primary Examiner

U.S. Cl. X.R.

108—60